US010838048B2

(12) United States Patent
Field et al.

(10) Patent No.: US 10,838,048 B2
(45) Date of Patent: Nov. 17, 2020

(54) APPARATUS AND METHOD FOR SELECTIVE DISABLING OF LIDAR DETECTOR ARRAY ELEMENTS

(71) Applicant: Quanergy Systems, Inc., Sunnyvale, CA (US)

(72) Inventors: Ryan Field, Palo Alto, CA (US); Tomoyuki Izuhara, Pleasanton, CA (US); Louay Eldada, Sunnyvale, CA (US)

(73) Assignee: Quanergy Systems, Inc., Sunnyvale, CA (US)

( * ) Notice: Subject to any disclaimer, the term of this patent is extended or adjusted under 35 U.S.C. 154(b) by 495 days.

(21) Appl. No.: 15/699,910

(22) Filed: Sep. 8, 2017

(65) Prior Publication Data

US 2019/0079172 A1  Mar. 14, 2019

(51) Int. Cl.
| | |
|---|---|
| *G01S 7/00* | (2006.01) |
| *G01S 7/4914* | (2020.01) |
| *G01S 17/32* | (2020.01) |
| *G01S 7/481* | (2006.01) |
| *G01S 17/42* | (2006.01) |
| *G01S 7/4863* | (2020.01) |

(52) U.S. Cl.
CPC .......... *G01S 7/4914* (2013.01); *G01S 7/4811* (2013.01); *G01S 7/4863* (2013.01); *G01S 17/32* (2013.01); *G01S 17/42* (2013.01)

(58) Field of Classification Search
USPC ....................................................... 356/5.01
See application file for complete search history.

(56) References Cited

U.S. PATENT DOCUMENTS

| | | | |
|---|---|---|---|
| 7,969,558 B2 | 6/2011 | Hall | |
| 8,427,649 B2* | 4/2013 | Hays | G01S 17/58 356/450 |
| 9,575,341 B2 | 2/2017 | Heck et al. | |
| 9,753,351 B2* | 9/2017 | Eldada | G02F 1/292 |
| 9,869,753 B2* | 1/2018 | Eldada | G01S 17/89 |
| 10,203,399 B2* | 2/2019 | Retterath | G01S 17/10 |
| 2010/0020306 A1* | 1/2010 | Hall | G01S 7/4813 356/5.01 |
| 2011/0164783 A1 | 7/2011 | Hays et al. | |
| 2015/0131080 A1 | 5/2015 | Retterath et al. | |
| 2015/0378187 A1* | 12/2015 | Heck | G02F 1/1326 250/227.21 |
| 2015/0378241 A1 | 12/2015 | Eldada | |
| 2016/0049765 A1 | 2/2016 | Eldada | |
| 2018/0045816 A1* | 2/2018 | Jarosinski | G01S 17/06 |

OTHER PUBLICATIONS

International Search Report and Written Opinion issued to International Patent Application No. PCT/US18/049395, dated Nov. 1, 2018, 7 pgs.
Niclass, C. et al. (2012). "Design and characterization of a 256×64-pixel single-photon imager in CMOS for a MEMS-based laser scanning time-of-flight sensor," Optics Express 20:11863-11881.

* cited by examiner

*Primary Examiner* — James R Hulka
(74) *Attorney, Agent, or Firm* — Cooley LLP

(57) ABSTRACT

An apparatus has a beam steerable laser emitter and a detector array with array elements. Electronics selectively enable first array elements corresponding to expected return signal paths and disable second array elements corresponding to unexpected return signal paths.

14 Claims, 3 Drawing Sheets

APPARATUS AND METHOD FOR SELECTIVE DISABLING OF LIDAR DETECTOR ARRAY ELEMENTS

FIELD OF THE INVENTION

This invention relates generally to optical signal processing. More particularly, this invention relates to techniques for selectively disabling LiDAR detector array elements to reduce multi-path interference and improve signal-to-noise ratio.

BACKGROUND OF THE INVENTION

In traditional laser ranging systems a laser source is paired with a detector array or point detector such that the reflected signals returning from the object being interrogated will fall on the detector array or point detector. The detector array may comprise, for example, Avalanche Photodiodes (APDs), PIN (p-type, intrinsic, n-type) photodiodes, Silicon Photomultipliers (SiPMs), or Single-Photon Avalanche Diodes (SPADs). For three-dimensional (3-D) sensing and mapping applications using this configuration, the laser and detector array are synchronously scanned across the scene by either mechanically rotating the laser and detector array or using a spinning mirror to sweep the laser across the scene. Some examples of laser scanning systems also include prisms for expanding the field-of-view of the system.

In these laser scanning systems, the signal-to-noise ratio is optimized by ensuring that the detector field-of-view matches closely with the laser spot size throughout the range of distances that should be measured by the system. This matching ensures that the detector will integrate the minimum amount of excess noise power while capturing all of the signal power. Further, this matching between detector and emitter also minimizes the likelihood that a signal from another sensor or a signal reflecting off of multiple surfaces would create a false detection event, called multi-path interference. Since these systems are well-aligned, all detected data should be processed as it should contain the return signal, if there is an object present. The major drawbacks to these systems are that they require precise alignment and have mechanical parts that are prone to failure.

Recently, these shortcomings have been addressed through the use of solid-state LiDAR technologies. With the transition to Solid-State LiDAR systems, the systems no longer have mechanical parts and use one of two methods for interrogating the scene with laser light. These methods are either a photonic beam steering approach (e.g. optical phase array (OPA) or liquid crystal), or a Flash LiDAR method in which a region of, or possibly the entirety of, the field-of-view is illuminated by a single laser pulse. With either of these approaches, the detector is no longer mechanically moved with the transmitter and must be able to collect the return signals from the entire field-of-view.

A hybrid system where a region of the field-of-view is illuminated in a manner like Flash LiDAR but the emission pattern is also scanned through the field-of-view is also possible. In this case, the detector can be scanned with the flash region and must only have a field-of-view (FoV) equal to the emission FoV.

Because of the requirement that the detector can observe a large field-of-view, a number of new issues emerge. For Flash LiDAR systems, the entire scene is illuminated simultaneously and an array of pixels is typically used to capture signals in parallel, much like a camera. Limitations of this approach are that multi-path reflections cannot be isolated, which means false positive detection events are likely, the detection resolution is limited to the array resolution, and that every pixel in the sensor has to be processed fully since no information is known about the emission pattern and the scene beforehand. A hybrid Flash/Scanning system can help since the detection field-of-view is narrowed, but the drawbacks of scanning LiDAR systems persist.

With the use of an OPA to control the emission pattern, there are two primary possibilities for detecting return signals. One is to have the return signals pass through the same optical path that is used to transmit the light. This allows the continued use of a single-point detector as is done in the laser scanning approach and as is common in phased-array implementations of RADAR and Ultrasound. There are challenges with implementing this approach in optical wavelengths that can lead to limitations on the overall LiDAR system. An alternative approach is to use an array of detectors to create an imaging device, similar to what can be used for Flash LiDAR, which can simultaneously observe the entire field-of-view. The drawbacks to this approach are the same as for the case of Flash LiDAR in that multi-path signals would be detected and data from every pixel in the array must be processed in order to determine which pixels are registering return signals.

This problem is illustrated in FIG. 1. A solid state beam steerable laser emitter (i.e., a non-mechanical scanning system, such as an OPA) 100 produces beams 102 to scan a field-of-view which includes objects 104. A detector array 106 must monitor the entire field-of-view. Consequently, the detector array 106 collects true field-of view return signals 108, but also collects multi-path interference signals 110.

Accordingly, there is a need for improved LiDAR detector array signal processing techniques.

SUMMARY OF THE INVENTION

An apparatus has a beam steerable laser emitter and a detector array with array elements. Electronics selectively enable first array elements corresponding to expected return signal paths and disable second array elements corresponding to unexpected return signal paths.

An apparatus has a beam steerable laser emitter and a detector array with array elements. A signal processing pipeline is connected to the detector array. The signal processing pipeline is configured to process first signals from first array elements corresponding to expected return signal paths and ignore second signals from second array elements corresponding to unexpected return signal paths.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
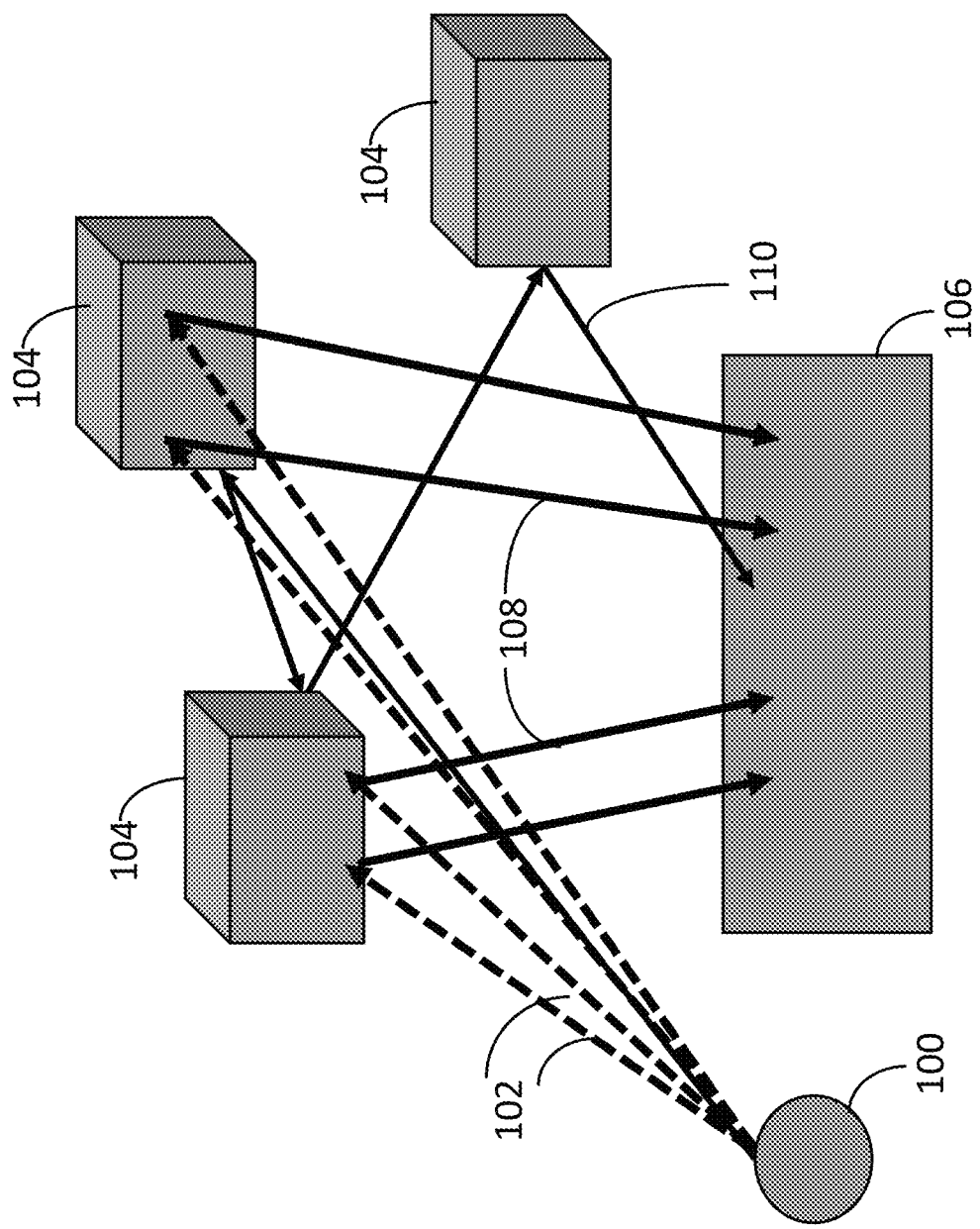
FIG. 1 illustrates a prior art LiDAR detector array vulnerable to multi-path interference.
Figure 2:
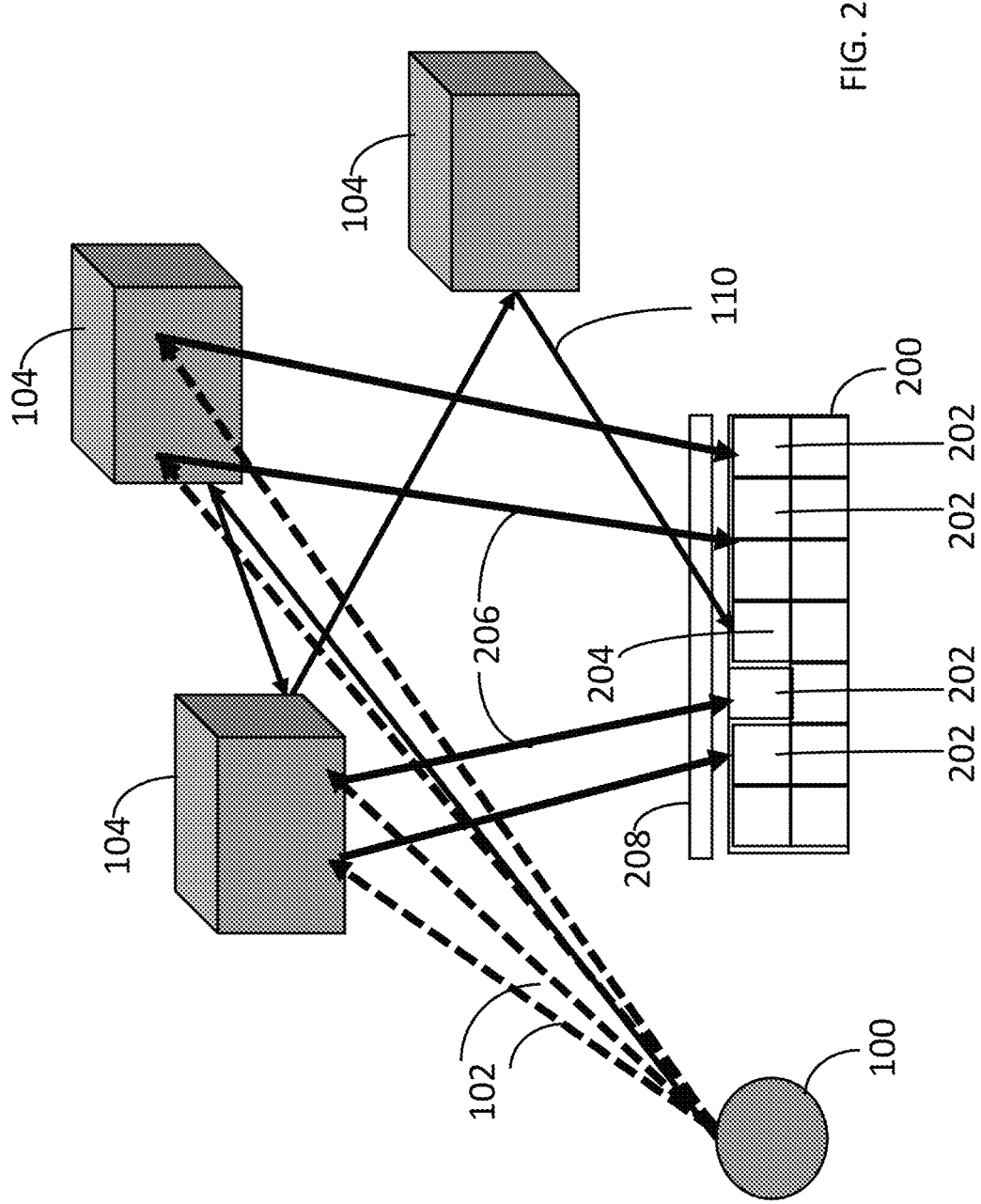
FIG. 2 illustrates a LiDAR detector array configured in accordance with an embodiment of the invention.

FIG. 2 illustrates a LiDAR detector array 200 configured in accordance with an embodiment of the invention. The LiDAR detector array 200 includes individual elements 202 that are selectively enabled to collect expected return signals 206 and individual elements 204 that are disabled if they are in a position that does not correspond to an expected return path. Thus, in this example, element 204 is disabled and therefore does not process multi-path interference signal 110. The detector array 200 may have an associated optical system 208 to focus optical energy on the detector array 200. In one embodiment, the optical system 208 includes individually addressable optical elements to focus or defocus optical energy onto the detector array to improve signal-to-noise ratio.

Figure 3:
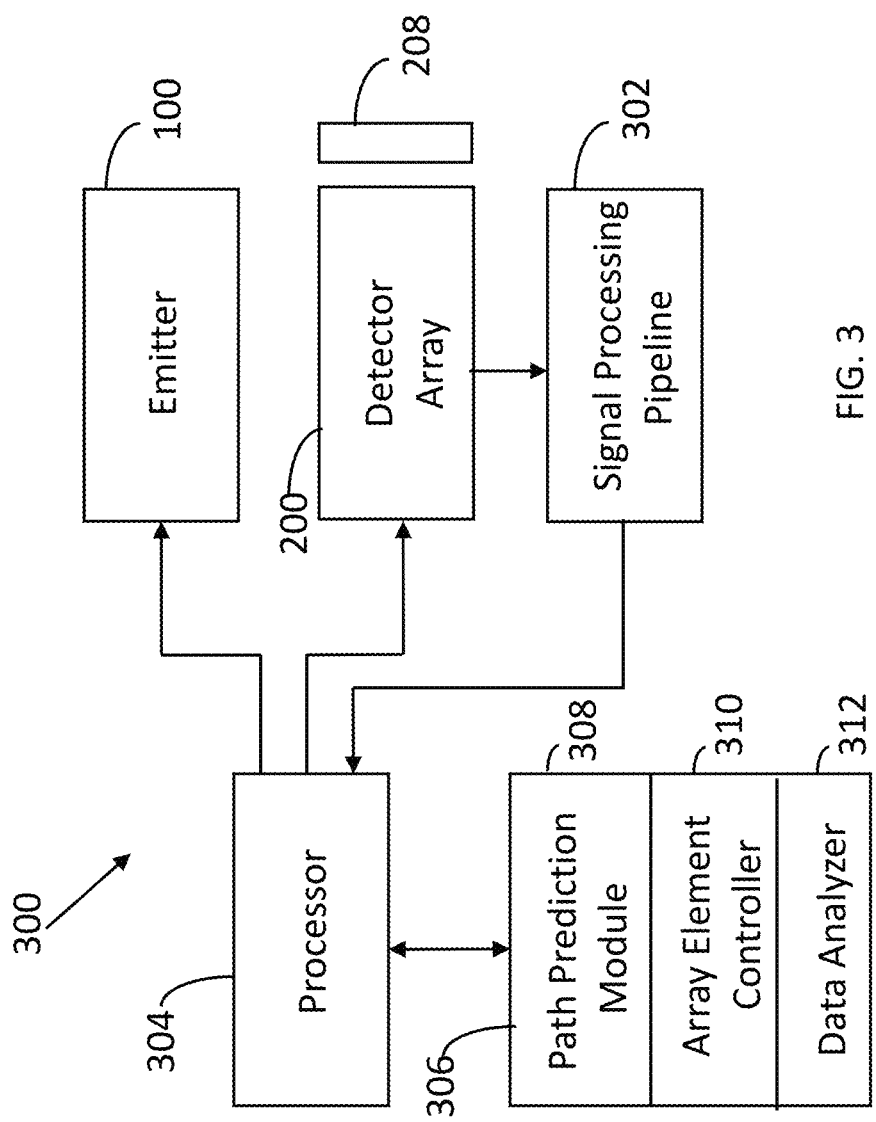
FIG. 3 illustrates signal processing components utilized in accordance with an embodiment of the invention.

FIG. 3 illustrates a system 300 with electronic components to implement an embodiment of the invention. The system 300 includes the emitter 100, detector array 200 and optical system 208. Signals from the detector array are applied to a signal processing pipeline 302, which is preferably a hardware based signal processing pipeline. These operations are coordinated by a processor 304. The processor 304 has an associated memory 306, which stores instructions executed by the processor 304 to implement operations of the invention. A path prediction module 308 includes instructions executed by the processor 304 to determine which LiDAR detector array elements should be enabled and disabled. The angle that the emitter is firing the laser is used to predict the return path. The angle of the beam steerable laser emitter and the position of the optical system may also be used to map expected return signals. The path prediction module 308 may include a calibration routine to map between emitter angle and expected detectors.

Once the array elements to be enabled and disabled are determined by the path prediction module 308, an array element controller 310 is used to enable or disable detector array elements. A data analyzer 312 may include instructions executed by the processor 304 to supplement the operations performed by the signal processing pipeline 302.

Thus, the invention localizes the optical signal response on an array of detectors, such that multi-path interference signal processing and other processing of noisy signals are minimized. This localization technique also allows for optimization of the detection signal-to-noise ratio by dynamically disabling array elements (e.g., pixels) or ignoring array elements that will not meaningfully contribute to the signal response for the emission pattern as it is scanned over the field-of-view.

An embodiment of the invention is a LiDAR system comprised of an optical-phased array or similar programmable beam steering element and a detector array that can dynamically adjust whether pixels/sensors are active or inactive. This invention could also apply to a hybrid LiDAR sensor configuration where a scanning laser is combined with a detector array provided that the current scan location can be known precisely. In such a system, a mapping between the current OPA state and the expected signal location of the detector can be applied to enable only detectors for which an appreciable signal is expected. Such a configuration enables the following features:

The LiDAR image/point cloud resolution can be determined by the emitter and is not limited by the resolution of the detector.

The return signal can be focused/defocused such that the number of detectors/pixels recording the signal can be adjusted. In other words, the enabled array element configuration may be altered in response to a change in emissions from the solid state laser emitter or the environmental conditions of the LiDAR.

If multiple detectors/pixels have a strong signal (i.e., high SNR) for a particular steering state, the signal from all pixels above a particular threshold can be combined to improve the detection SNR. This may be implemented in the signal processing pipeline 302.

Pixels outside of the expected detection can be disabled and not combined so that SNR is not degraded by noise or ambient light from outside of the region of interest.

Multi-path interference can be reduced since the expected location of the signal return is known.

Signal processing elements can be used efficiently and fewer resources are required versus the case when all pixels must be processed separately. This reduces power consumption.

The emitter/OPA spatial control mechanism is used to precisely and reliably control the location of the primary emission pattern within the sensor field-of-view. A mapping process identifies which detector/pixel or group of detectors/pixels should be active for each possible state of the emitter steering mechanism.

A detector array is designed with the capability to dynamically enable/disable individual pixels in the array. Alternatively, the signal processing pipeline 302 may be configured to ignore array element signals for certain emitter steering states. The detector array is configured with a map generated for each emitter state and the detectors/pixels configuration is updated for every beam steering state.

A measurement circuitry block may be used to measure the signals from the active detectors/pixels in the array. Multiple detectors/pixels can share measurement electronics through multiplexing.

The signal processing pipeline 302 should only evaluate data from known regions of interest for each state. The signal processing pipeline 302 can combine data from multiple detectors/pixels for a given state to improve the SNR of the measured return signal.

Thus, with the use of an Optical Phased Array as the emitter in a LiDAR system, one is able to precisely control the laser emission pattern in 1-D or 2-D space. By knowing where the emission is aimed in space, one can anticipate where the desired signal will register on an array of detectors. With this knowledge, the array element controller 310 dynamically disables unused detectors. Alternately, the signal processing pipeline 302 ignores signals that are registered on unexpected return signal path array elements. The benefits of these techniques include improving detection SNR, reduced possibility of multi-path detections, and lower signal processing throughput requirements.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An apparatus, comprising:
a beam steerable laser emitter configured as an optical-phased array;
a detector array with array elements to monitor an entire field-of-view, thereby collecting true field-of-view return signals and multi-path interference signals;
an optical system to focus optical energy onto the detector array; and
electronics to selectively enable first array elements corresponding to expected return signal paths of the true field-of-view return signals and disable second array elements corresponding to unexpected return signal paths of the multi-path interference signals.

2. The apparatus of claim 1 wherein the electronics include a processor and instructions executed by the processor to utilize an angle of the beam steerable laser emitter to map expected return signal paths to the first array elements.

3. The apparatus of claim 1 wherein an angle of the beam steerable laser emitter and the position of the optical system are used to map expected return signal paths to the first array elements.

4. The apparatus of claim 1 wherein the electronics include a processor and an array element controller.

5. The apparatus of claim 1 further comprising a hardware signal processing pipeline connected to the detector array.

6. The apparatus of claim 1 wherein the hardware signal processing pipeline only processes signals above a specified signal-to-noise ratio.

7. The apparatus of claim 1 further comprising instructions executed by the processor to alter the configuration of the first array elements in response to a change in emissions from the beam steerable laser emitter.

8. The apparatus of claim 1 wherein the optical system is adjusted to focus or defocus optical energy onto the first array elements to improve signal-to-noise ratio.

9. An apparatus, comprising:
a beam steerable laser emitter configured as an optical-phased array;
a detector array with array elements to monitor an entire field-of-view, thereby collecting true field-of-view return signals and multi-path interference signals;
an optical system to focus optical energy onto the array; and
a signal processing pipeline connected to the detector array, the signal processing pipeline configured to process first signals from first array elements corresponding to expected return signal paths of the true field-of-view return signals and ignore second signals from second array elements corresponding to unexpected return signal paths of the multi-path interference signals.

10. The apparatus of claim 9 further comprising a processor and instructions executed by the processor to utilize an angle of the solid state laser emitter to map expected return signal paths to the first array elements.

11. The apparatus of claim 9 wherein an angle of the beam steerable laser emitter and the position of the optical system are used to map expected return signal paths to the first array elements.

12. The apparatus of claim 9 wherein the hardware signal processing pipeline only processes signals above a specified signal-to-noise ratio.

13. The apparatus of claim 9 further comprising instructions executed by the processor to alter the configuration of the first array elements in response to a change in emissions from the solid state laser emitter.

14. The apparatus of claim 9 wherein the optical system is adjusted to focus or defocus optical energy onto the first array elements to improve signal-to-noise ratio.

* * * * *